United States Patent
Hallstrom

(10) Patent No.: US 8,123,454 B2
(45) Date of Patent: Feb. 28, 2012

(54) GARBAGE TRUCK AND SELF-CONTAINED LOADING AND UNLOADING SYSTEM THEREFOR

(75) Inventor: Olof A. Hallstrom, Tillamook, OR (US)

(73) Assignee: Hallco Industries, Inc., Tillamook, OR (US)

( * ) Notice: Subject to any disclaimer, the term of this patent is extended or adjusted under 35 U.S.C. 154(b) by 441 days.

(21) Appl. No.: 11/821,187

(22) Filed: Jun. 21, 2007

(65) Prior Publication Data

US 2008/0317568 A1 Dec. 25, 2008

(51) Int. Cl.
*B65F 3/20* (2006.01)
*B65F 3/28* (2006.01)

(52) U.S. Cl. ............... 414/517; 198/750.2; 414/492; 414/525.6

(58) Field of Classification Search ............ 414/492, 414/510, 517, 525.1, 525.6, 525.9
See application file for complete search history.

(56) References Cited

U.S. PATENT DOCUMENTS

| | | | | |
|---|---|---|---|---|
| 3,231,111 A | * | 1/1966 | Clar | 414/525.6 |
| 3,643,824 A | * | 2/1972 | Partridge | 414/492 |
| 3,815,765 A | * | 6/1974 | Moser et al. | 414/512 |
| 3,921,839 A | * | 11/1975 | Herpich | 414/408 |
| 3,955,694 A | * | 5/1976 | Herpich | 414/513 |
| 4,096,956 A | * | 6/1978 | Gaskin | 414/501 |
| 4,143,760 A | | 3/1979 | Hallstrom | |
| 4,184,587 A | * | 1/1980 | Hallstrom | 198/750.2 |
| 4,221,527 A | * | 9/1980 | Morrison | 414/517 |
| 4,576,540 A | * | 3/1986 | Derain et al. | 414/511 |
| 4,627,783 A | * | 12/1986 | De Filippi | 414/517 |
| 4,823,938 A | * | 4/1989 | Foster | 198/750.4 |
| 4,948,323 A | * | 8/1990 | Gasparini | 414/408 |
| 4,966,275 A | | 10/1990 | Hallstrom | |
| 5,092,732 A | | 3/1992 | Foster | |
| 5,096,356 A | | 3/1992 | Foster | |
| 5,228,555 A | * | 7/1993 | Hallstrom | 198/750.5 |
| 5,332,081 A | | 7/1994 | Quaeck | |
| 5,344,273 A | * | 9/1994 | Radlein | 414/409 |
| 5,402,878 A | | 4/1995 | Lutz | |
| 5,522,494 A | | 6/1996 | Lutz | |
| 6,027,300 A | | 2/2000 | Richards | |
| 6,146,078 A | * | 11/2000 | Hamill et al. | 414/511 |
| 6,497,547 B1 | * | 12/2002 | Maglaras | 414/525.2 |
| 6,513,648 B1 | | 2/2003 | Hallstrom | |
| 6,827,542 B1 | * | 12/2004 | Stragier | 414/525.2 |
| 7,320,395 B2 | | 1/2008 | de Baat | |

* cited by examiner

*Primary Examiner* — James Keenan
(74) *Attorney, Agent, or Firm* — Law Office of Karen Dana Oster, LLC

(57) ABSTRACT

An elongated container of a truck has a closed front end wall and a hinged rear outlet closure, and a side infeed opening for receiving garbage. This empty container is configured to receive an elongated base upon which is mounted a reciprocating conveyor floor for moving garbage in the container outward through the opened rear closure for deposit at a garbage disposal site. The power drive mechanism for driving the reciprocating floor is located at the front end of the container and is shielded from input garbage by a deflector secured to the reciprocating floor. The deflector also serves as a pusher for compacting and moving garbage in the container out through the opened rear closure. The self-contained reciprocating floor is easily carried manually and fed through the opened rear closure and secured firmly in the truck container.

22 Claims, 6 Drawing Sheets

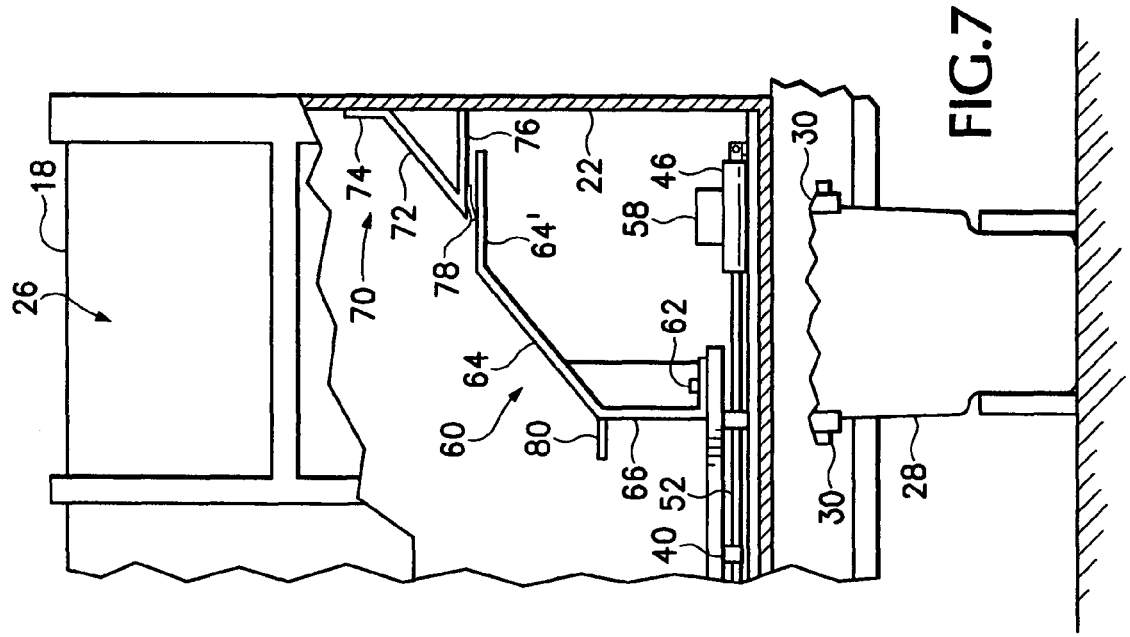
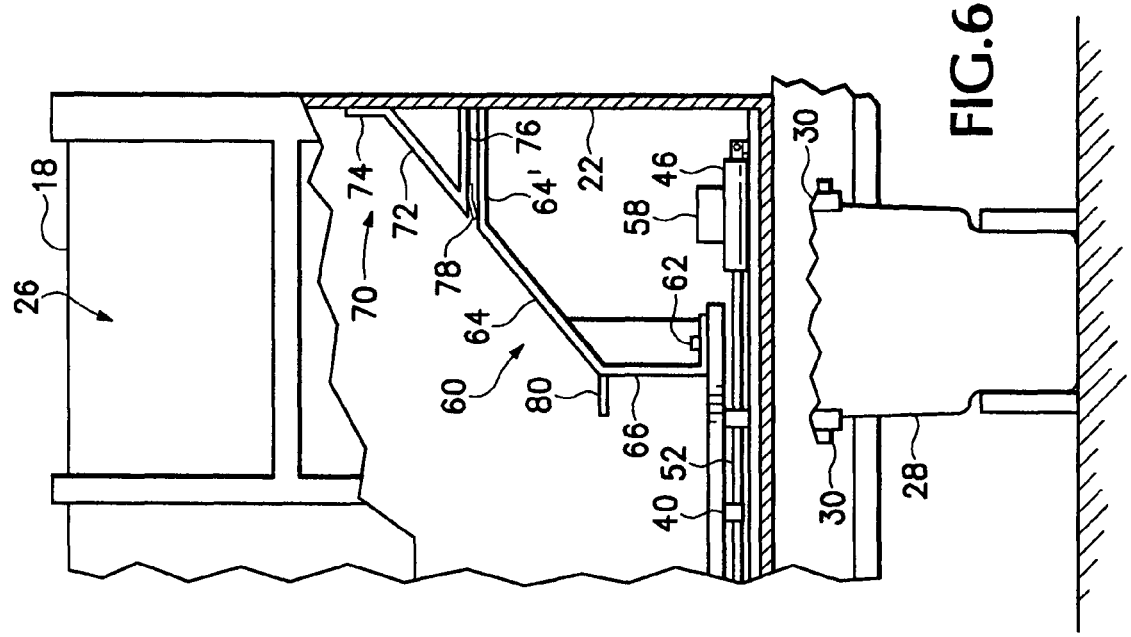

GARBAGE TRUCK AND SELF-CONTAINED LOADING AND UNLOADING SYSTEM THEREFOR

BACKGROUND OF THE INVENTION

This invention relates to particulate material hauling, and more particularly to a self-contained garbage loading and unloading system capable of removable installation in a truck container.

Conventional garbage trucks incorporate the structural components by which garbage is received in the garbage truck container and compacted to minimum bulk and finally discharged from the container at a garbage disposal site. The many structural components are required to be installed in each truck, so the cost of components and labor is high and is maximized by the time required for manufacture and installation.

SUMMARY OF THE INVENTION

In its basic concept, the present invention provides a self-contained particulate product loading and unloading system that enables the conversion of an empty truck container to a complete, fully operative particulate product handling truck simply by installing the self-contained system of this invention in the empty truck container. The self-contained system of this invention is producible by high speed factory assembly, at minimum cost, and requires minimum skill and physical effort in manually placing the integrated system in the truck container and securing it in operative position.

The primary objective of this invention is to provide a self-contained particulate material loading and unloading system capable of removable installation in the empty container of a conventional truck.

Another objective of this invention is the provision of a self-contained loading and unloading system produced economically by factory assembly and capable of manual installation in an empty container of a truck, with speed and facility.

A further objective of this invention is to provide a self-contained particulate material loading and unloading system that includes means for shielding the structure of the system from particulate material fed into the empty container of a truck and for assisting the unloading of particulate material from the container.

Still another objective of this invention is the provision of a self-contained particulate material loading and unloading system capable of ready installation in a closed top truck container of substantial length for handling large amounts of particulate material from several smaller containers for transport to a disposed site.

These and other objects and advantages of this invention will appear from the following detailed description taken in conjunction with the accompanying drawings of a preferred embodiment.

BRIEF DESCRIPTION OF THE DRAWINGS

FIG. 6 is a fragmentary side elevation, partly broken away as in FIG. 3, to disclose structural details of a modification of the system shown in FIG. 3.

FIG. 7 is a fragmentary side elevation, as in FIG. 6, showing the structural components in an intermediate position of operation, analogous to FIG. 4.

DESCRIPTION OF THE PREFERRED EMBODIMENT

Figure 1:
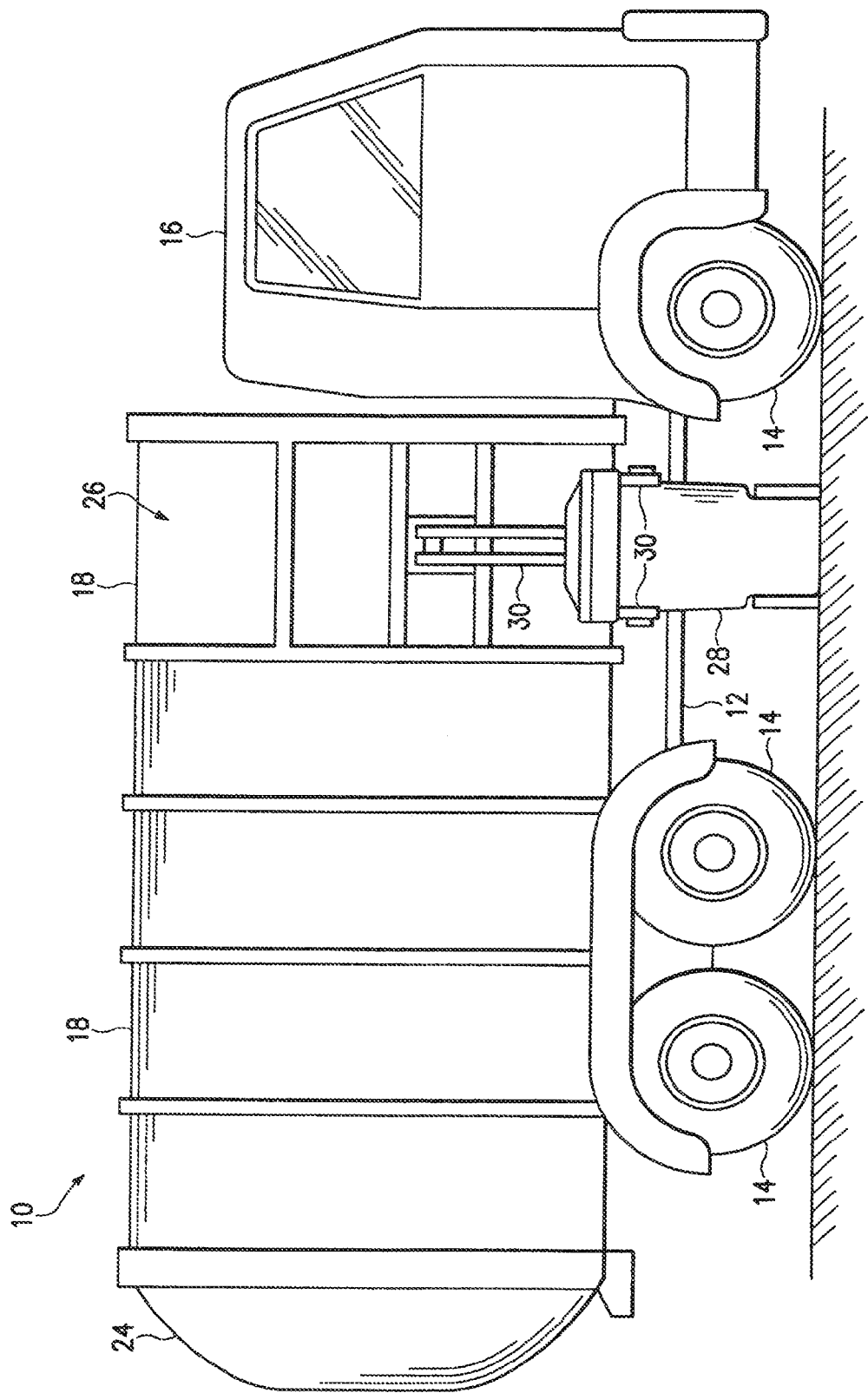
FIG. 1 is a side elevation of a conventional garbage truck, for illustration.

FIG. 1 illustrates a conventional garbage hauling truck 10 having a chassis 12 supported on wheels 14 and provided with a cab 16 housing an engine for propelling the truck, and a driver's compartment, and an elongated container 18 for filling with garbage to be hauled to a disposal site.

Figure 2:
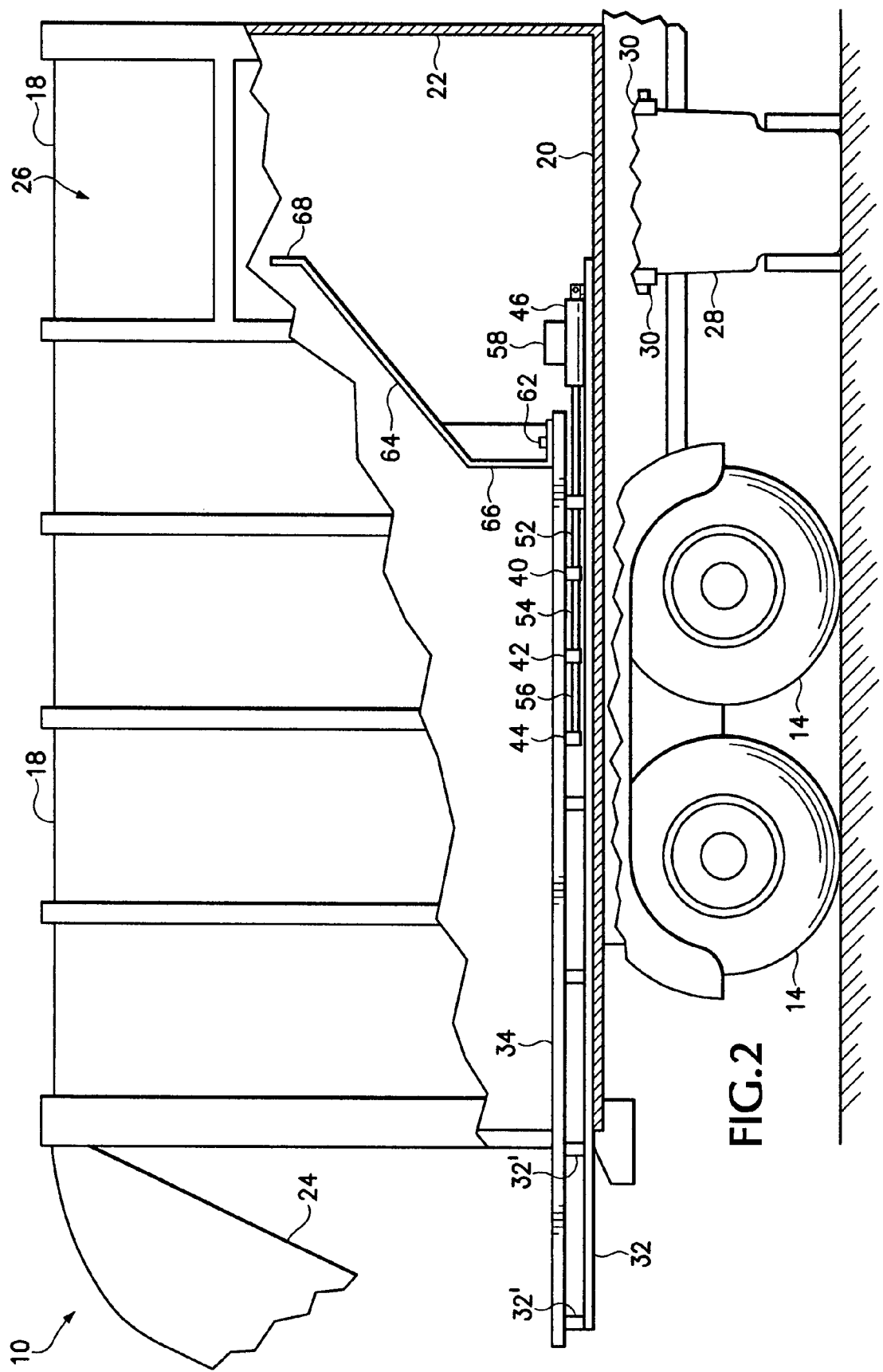
FIG. 2 is a fragmentary side elevation, partially broken away, with the rear door of the container compartment open to permit access to the interior of the container for installation of the self-contained garbage handling system, the system being shown at an intermediate position of manual installation into the container.
Figure 3:
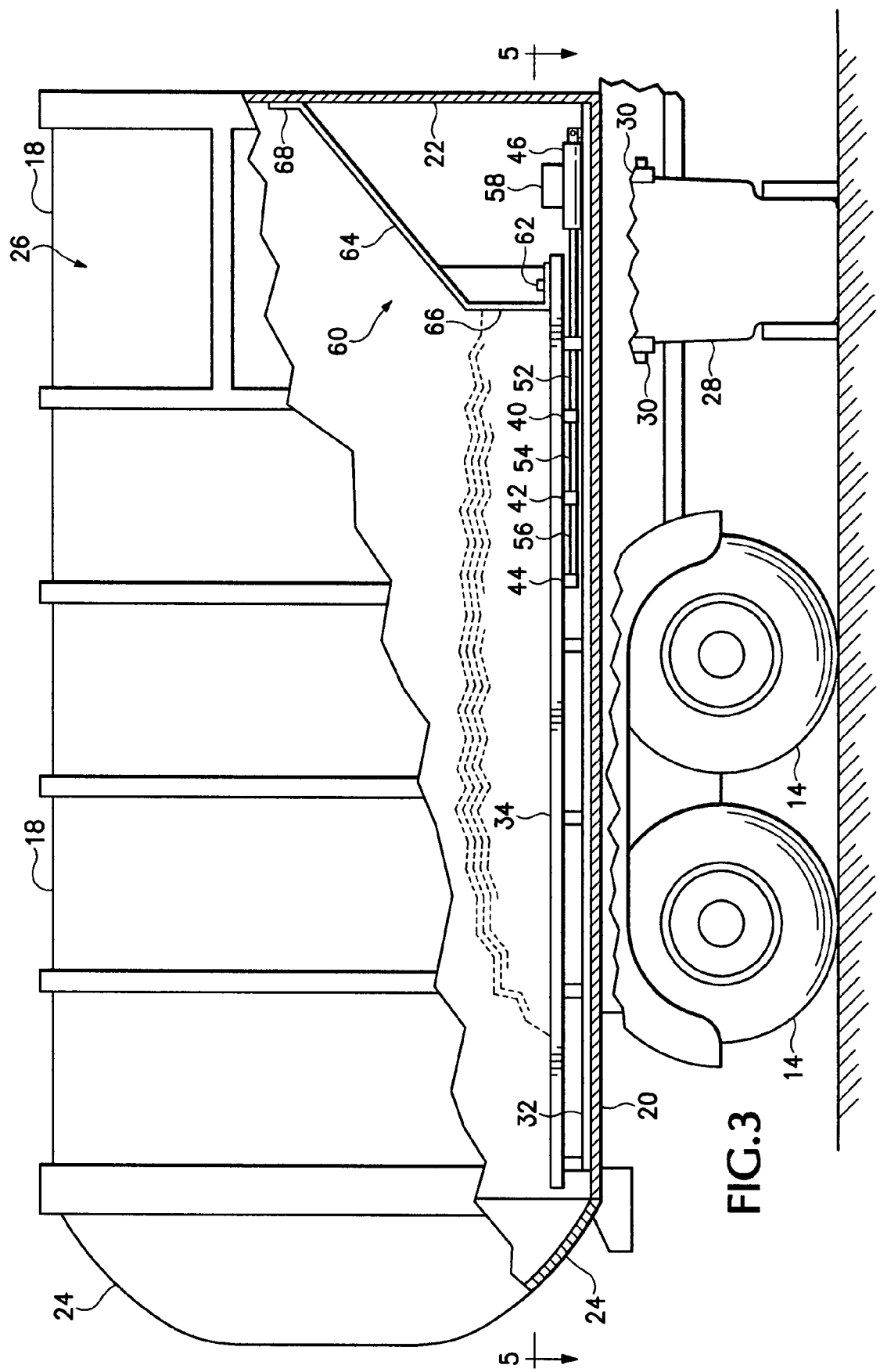
FIG. 3 is a fragmentary side elevation of the garbage truck of FIG. 1, a portion of the side of the truck container being broken away to disclose details of construction of the self-contained loading and unloading system of this invention, with the components of a reciprocating floor having begun loading the container with garbage.

Referring first to FIG. 2 of the drawings, the container 18 has a floor 20, a front wall 22 and a hinged rear discharge door 24. An infeed side opening 26 in the container serves to accept garbage from conventional garbage cans 28. A can is grasped by a hydraulic lifter 30 on the truck and lifted arcuately upward and inward through the side opening 26 as it is up-ended to discharge its contents into the container 18. The container preferably has a closed top to avoid expelling garbage to the streets.

It is to be understood that other types of trucks also may be used, the only requirement being a discharge door 24 and a garbage inlet 26 in the container 8. In some garbage trucks the garbage is fed into the truck container through the rear door 24.

The embodiment illustrated in FIGS. 2-5 of the drawings employs a reciprocating conveyor floor for moving garbage from its site of introduction into the container 18 through side opening 26 and thence toward and ultimately through the rear door 24. The reciprocating floor includes a supporting base 32, 32' for a plurality of elongated slats arranged side-by-side across the width of the container floor 20 and forming a plurality of groups of slats 34, 36, 38 disposed parallel to each other and extending longitudinally within the container 18. Transverse beams 40, 42, 44 secure the slats of each group together for movement between retracted and extended positions, as by hydraulic drive cylinders 46, 48, 50 coupled to transverse beams 40, 42, 44 by drive rods 52, 54, 56, respectively.

The drive cylinders are coupled to a source of hydraulic fluid pressure, through selector valves, by any of a variety of selected control systems, examples of which are described in my earlier issued U.S. Pat. Nos. 3,534,875; 4,144,963; 4,691, 819; 4,856,645; 4,966,275; 5,263,573; and 6,513,648. These patents are made part of this application by reference.

The hydraulic fluid pressure drive cylinders 46, 48, 50 and their control system 58 are located in the front end portion of the garbage truck container 18, adjacent front wall 22, and are shielded from incoming garbage at the infeed side opening 26, by a combination garbage shield and garbage pusher 60 which extends the full width of floor 20 and is secured by anchors 62 to the horizontal bottom portions to the slat 38 of each group of slats. The sloping section 64 shields against incoming garbage encroaching upon the drive mechanism, and the vertical leading pusher section 66 serves to pack and push garbage toward the rear door 24 as the floor slats are moved in that direction, as explained hereinafter.

The vertical trailing section 68 serves to engage and abut the front wall 22 when the conveyor slats are fully retracted, to close the front area of the slats and drive mechanism from incoming garbage. It is slat 38 of each slat group that is operated by control system 58 to be moved in the outfeed direction toward the rear door 24 while slats 34 and 36 are moved sequentially in the retracting and advancing directions and then in the advancing direction with slats 38. Advancing movement of all three slats provides maximum pushing power for movement of garbage toward and through the opening of the rear door 24.

Operation of the system described hereinbefore is as follows:

In the loading operation, garbage is picked up at the various sites of garbage cans 28, where each can is grasped by the hydraulic lifter 30 and lifted upward and inward through the side opening 26 as it is upended to deposit its content of garbage into the dump truck container 18, onto the sloping section 64 of the combination shield and pusher 60. The reciprocating conveyor slats 34, 36, 38 are driven by control system 58 to move slats 34 and 36 sequentially and then all three slats of the groups of slats simultaneously toward the rear door 24, moving the garbage on the conveyor slats with them.

When the conveyor slats reach the end of the outfeeding stroke of all three hydraulic cylinders 46, 48, 50 the control system 58 operates to stop the movement of slats 38 and to initiate rearward, retracting movement of one of the slats 34 of each group of slats, at a higher rate of speed, to its fully retracted position, and then initiates retraction of the other group of slats 36, also at the higher rate of speed, to their fully retracted position. Finally, slats 38 of all groups of slats are retracted, to complete full retraction of all slats.

This sequence of operation of the three groups of slats effectively returns all slats to their newly advanced starting positions. By retracting only one slat of each group at a time, the load of garbage does not move rearward because the load rests upon two of the three slats of each group that are not moving at all. Thus, the cycle of operation of the slats is completed and the next cycle of operation is initiated by movement of all three slats of each group in the direction in which the garbage is moved toward the rear door 24. Continued operation of the three slats of each group results in moving garbage continuously toward the rear door until the container 18 has been filled with compacted garbage, as suggested by the broken lines in FIG. 4. The load of garbage then is taken to a disposal site where the rear door 24 is opened and the reciprocating conveyor is operated on the continuous cycle disclosed above, to discharge the garbage from the truck.

In the unloading operation, the conveyor slats 34, 36, 38 are moved in the direction of the rear door 24 simultaneously to move the garbage in the off-loading direction. Each time the slat 38 of each group of slats is moved in the off-loading direction, the shield and pusher member 60 is moved with it, whereby the vertical section 66 effects moving the garbage toward the rear door 24. Continued operation of the system effects movement of the garbage from the accumulated condition illustrated in broken lines in FIG. 4, outward through the opened rear door 24, from whence it is deposited at the disposal site.

Figure 4:
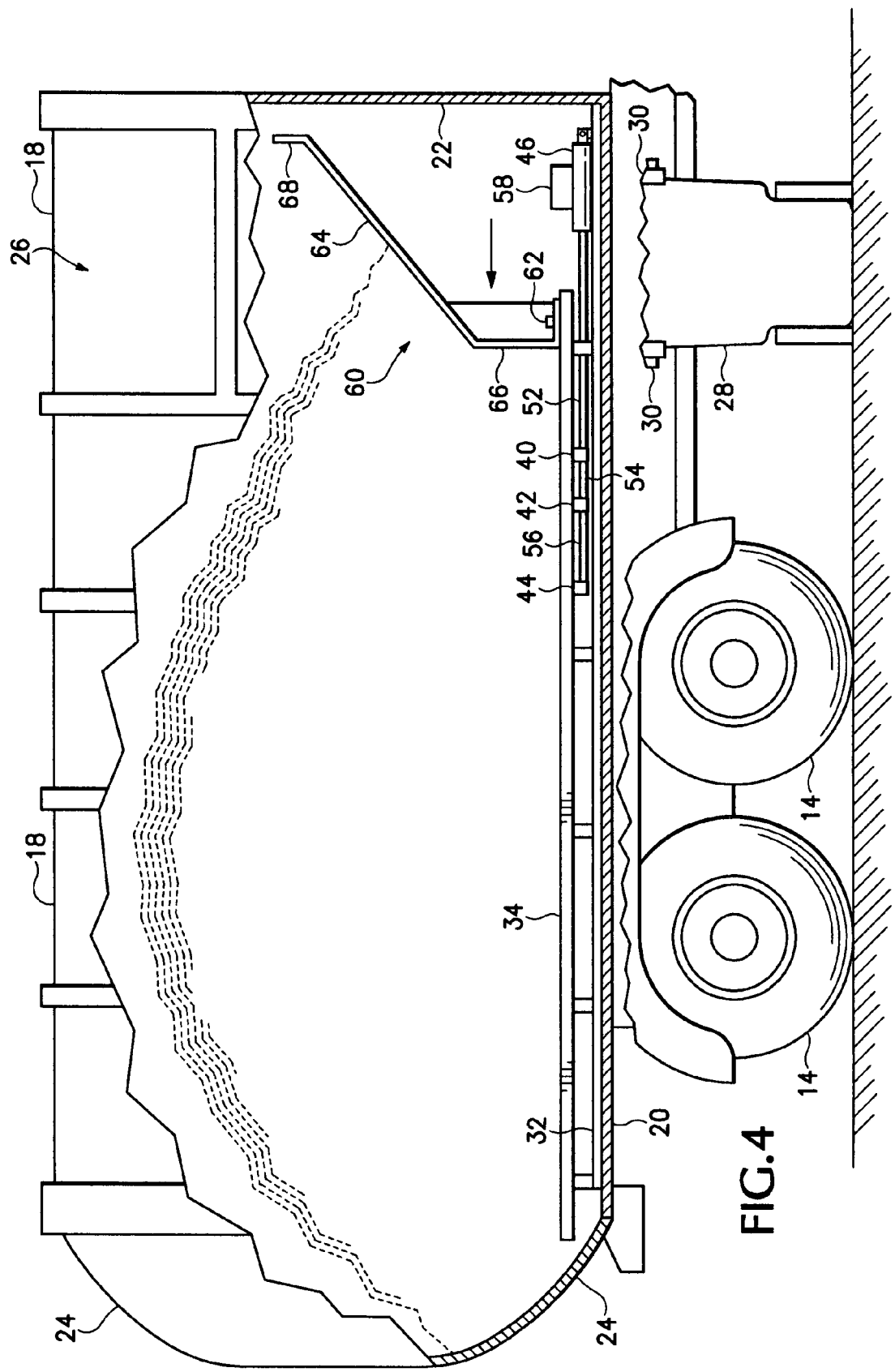
FIG. 4 is a fragmentary side elevation, similar to FIG. 3 with the garbage moving components in a position advanced from the starting position of FIG. 3 and showing in broken lines the system having filled the container with garbage and ready for off-loading at a garbage dump site.
Figure 5:
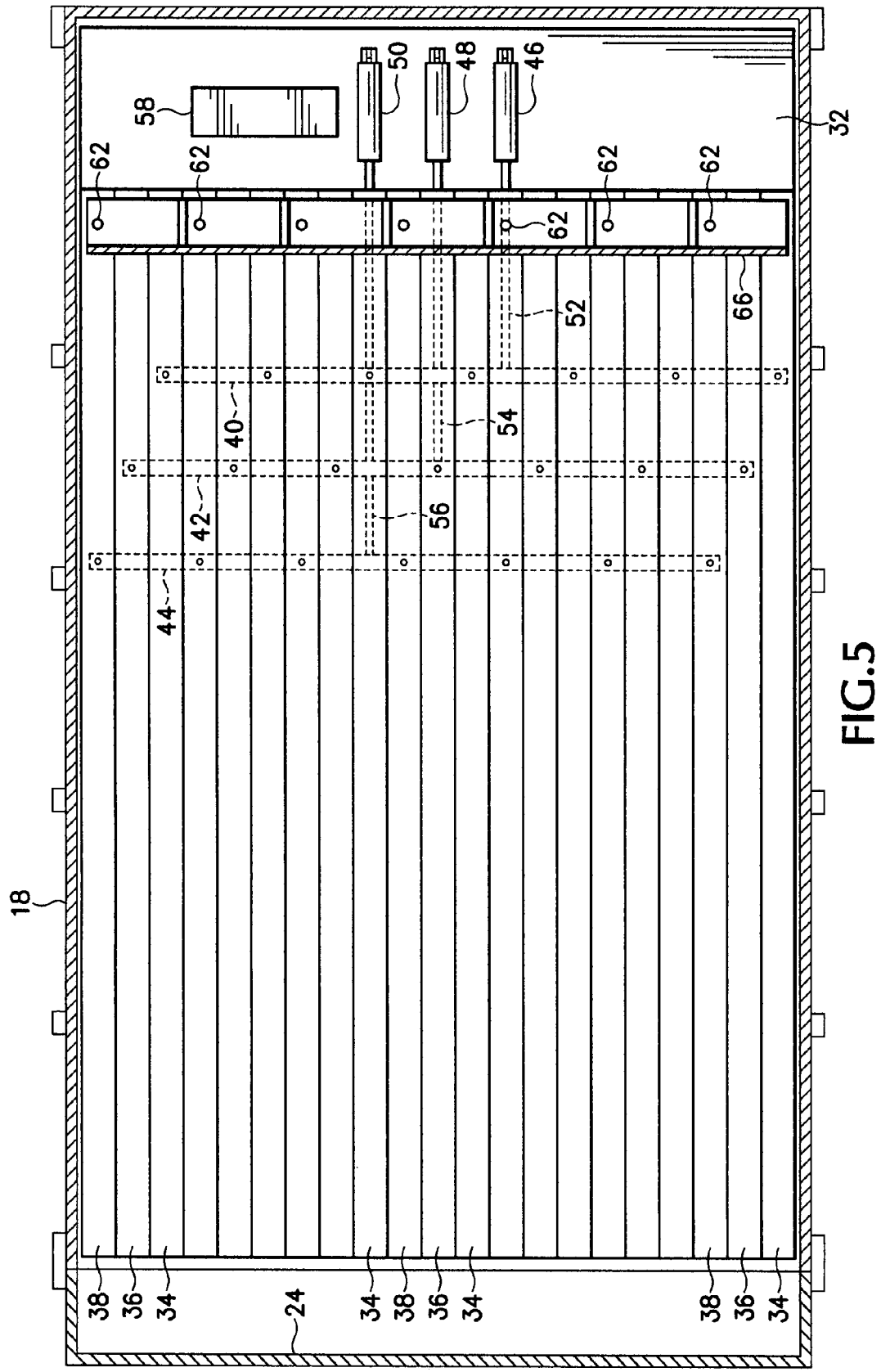
FIG. 5 is a horizontal section taken on the line 5-5 in FIG. 3 illustrating the structural configuration of a reciprocating floor for effecting loading of garbage into the container and off-loading garbage at a disposal site.

The embodiment illustrated in FIGS. 6 and 7 discloses a modification of the combination garbage shield and garbage pusher 60 of the first embodiment, in the form of a separate end segment 70, to eliminate the possibility of garbage entering the space under the shield and pusher 60 through the gap between the front wall 22 and the trailing section 68 (FIG. 4). Thus, the sloping section 64 registers with sloping section 72 of separate end segment 70. The section 72 terminates in vertical end section 74. The section 72 also merges with horizontal lower section 76 extending from the lower end of sloping section 72. The end section 74 and free end of section 76 are configured to be secured, as by welding, bolts, screws, etc., to the front wall 22.

When the shield and pusher 60 is in fully retracted position, with trailing section 64' abutting front wall 22, the sloping sections 64 and 72 are in alignment and horizontal section 76 is disposed parallel to and above the horizontal extension 64' of sloping section 64 (FIG. 6). A flexible sealing member 78 extends the full width of the container 18 and is secured adjacent the juncture of sections 72 and 76. The free edge of member 78 extends into sliding engagement with horizontal extension 64' to preserve the seal during movement of the shield and pusher 60 with the conveyor slats 38. A load-trapping member 80 projects from the upper end of load pusher section 66 to maximize the accumulation of garbage against the section 66.

It will be apparent to those skilled in the art that various changes and modifications of the systems described hereinbefore may be made without departing from the spirit of this invention and the scope of the appended claims. For example, the systems may be used to move a variety of types of particulate material from any starting location to any final position.

Having thus described my invention and the manner in which it may be used, I claim:

1. A particulate material loading and unloading system installable in an empty container having a floor, said system comprising:
   a) a self-contained particulate material loading and unloading system comprising:
      i) an elongated base member configured for removable installation between a product loading position and a product unloading position,
      ii) an elongated reciprocating conveyor secured movably on said elongated base member,
         A) said reciprocating conveyor configured to reciprocate between said loading position and said unloading position for moving particulate material toward said unloading position,
         B) said reciprocating conveyor having a plurality of elongated slats arranged side-by-side across the width of said base member and secured together as a plurality of groups, each group comprising a plurality of slats arranged for independent reciprocation of each slat of said group, and
      iii) at least one power drive on and above said base member, said at least one power drive engaging said reciprocating conveyor for reciprocating the latter, and
   b) said self-contained particulate material loading and unloading system installable and removable as an integrated system above said floor of said empty container, c) wherein said floor remains intact upon installation or removal of said self-contained particulate material loading and unloading system.

2. The system of claim 1, said self-contained particulate material loading and unloading system further comprising a deflector for diverting incoming particulate material from said reciprocating conveyor power drive.

3. The system of claim 2 further comprising attachment means for securing said deflector to said reciprocating conveyor for moving said deflector with said reciprocating conveyor to move particulate material toward said unloading position.

4. The system of claim 2 wherein said deflector is secured to said reciprocating conveyor for movement with one slat member of each group of slat members.

5. The system of claim 2 wherein said deflector is arranged to shield said power drive from incoming particulate material.

6. The system of claim 2 wherein said deflector is arranged to move particulate material toward said unloading position.

7. The system of claim 2 wherein said deflector is arranged to shield said power drive from incoming particulate material and to move particulate material toward said unloading position.

8. The system of claim 2 wherein said deflector comprises a transverse member configured to extend across the width of said slat members, and attaching means securing one slat member of each group of slat members to said deflector.

9. The system of claim 1 wherein said power drive is connected to the interconnected slats of each group for reciprocating the interconnected slats of said groups of slats for moving particulate material toward said unloading position.

10. The system of claim 1, said self-contained particulate material loading and unloading system further comprising a movable deflector for diverting incoming particulate material from said power drive, said power drive substantially positioned under said movable deflector.

11. The system of claim 1, said self-contained particulate material loading and unloading system further comprising a deflector and a separate end segment separate from said self-contained particulate material loading and unloading system and any component thereof, said deflector and said separate end segment together for diverting incoming particulate material from said power drive.

12. The system of claim 1 wherein installation of said self-contained particulate material loading and unloading system in an empty container converts said empty container into a complete, fully operative particulate product handling container.

13. The system of claim 1, said elongated base member substantially spanning the distance between said product loading position and said product unloading position.

14. The system of claim 1, said integrated system feedable through a door at an end of said container.

15. A particulate material loading and unloading system for installation in a container having a floor, said container having a product loading position and a product unloading position, said system comprising:
  a) a self-contained particulate material loading and unloading system comprising:
    i) an elongated base member configured for removable installation between said product loading position and said product unloading position,
    ii) an elongated reciprocating conveyor having a plurality of groups of slat members, said elongated reciprocating conveyor secured movably on said elongated base member and configured to reciprocate between said loading position and said unloading position for moving particulate material toward said unloading position,
    iii) at least one power drive on and above said base member, said at least one power drive engaging said reciprocating conveyor for reciprocating the latter, and
    iv) a movable deflector for diverting incoming particulate material from said power drive, said power drive substantially positioned under said movable deflector, and
  b) said self-contained particulate material loading and unloading system installable and removable as an integrated system above said floor of said container,
  c) wherein said floor remains intact upon installation or removal of said self-contained particulate material loading and unloading system.

16. The system of claim 15 wherein said movable deflector is secured to said reciprocating conveyor for movement with one slat member of each group of slat members.

17. The system of claim 15 further comprising a separate end segment separate from said self-contained particulate material loading and unloading system and any component thereof, said movable deflector and said separate end segment together for diverting incoming particulate material from said power drive.

18. The system of claim 15 wherein installation of said self-contained particulate material loading and unloading system in an empty container converts said empty container into a complete, fully operative particulate product handling container.

19. A particulate material loading and unloading system for an elongated container having an end wall, a floor, and an outfeed door, said system comprising:
  a) a self-contained particulate material loading and unloading system comprising an elongated base member, an elongated reciprocating conveyor, at least one power drive, and a deflector, said self-contained particulate material loading and unloading system removably installable within said elongated container as an integrated system,
  b) said elongated base member substantially spanning the distance between said end wall and said outfeed door when positioned within said elongated container,
  c) said elongated reciprocating conveyor secured movably on said elongated base member and configured to reciprocate between said end wall and said outfeed door and thereby move particulate material toward said outfeed door,
  d) said power drive on and above said base member, said at least one power drive engaging said reciprocating conveyor for reciprocating the latter,
  e) said reciprocating conveyor is formed of a plurality of elongated slats arranged side-by-side across the width of said base member and secured together as a plurality of groups, each group comprising a plurality of slats arranged for independent reciprocation of each slat of said group, and
  f) said deflector for diverting incoming particulate material from said reciprocating conveyor power drive,
  g) wherein installation of said self-contained particulate material loading and unloading system above said floor of said elongated container converts said elongated container into a complete, fully operative particulate product handling container, h) wherein said floor remains intact upon installation or removal of said self-contained particulate material loading and unloading system.

20. The system of claim 19 wherein said power drive is substantially positioned under said deflector.

21. The system of claim 19 further comprising a separate end segment separate from said self-contained particulate material loading and unloading system and any component thereof, said deflector and said separate end segment together for diverting incoming particulate material from said power drive.

22. The system of claim 19 wherein said power drive is connected to the interconnected slats of each group for reciprocating the interconnected slats of said groups of slats for moving particulate material toward said unloading position.

* * * * *